United States Patent Office 3,231,287
Patented Jan. 25, 1966

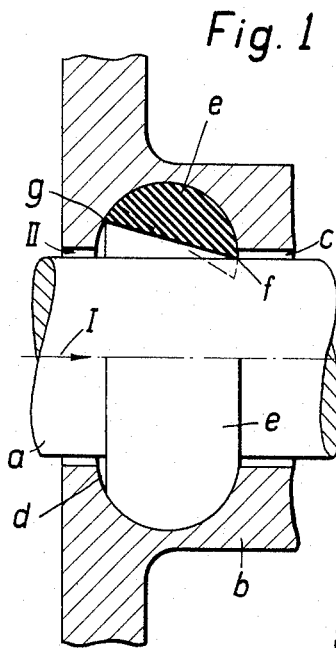
Fig. 1
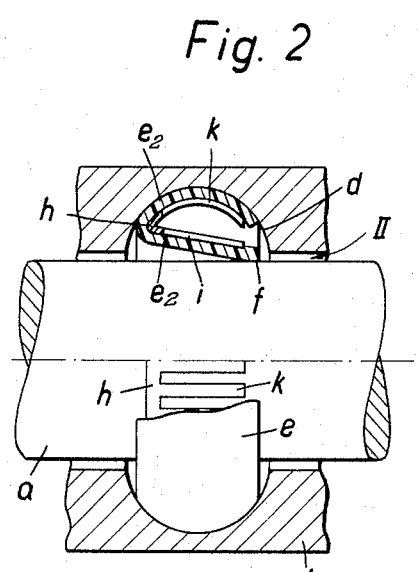
Fig. 2
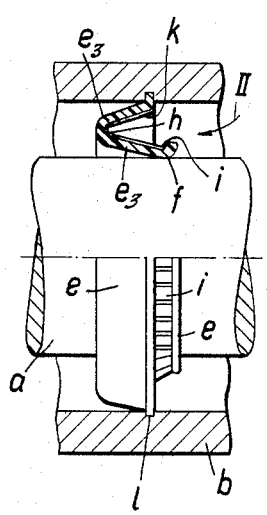
Fig. 3
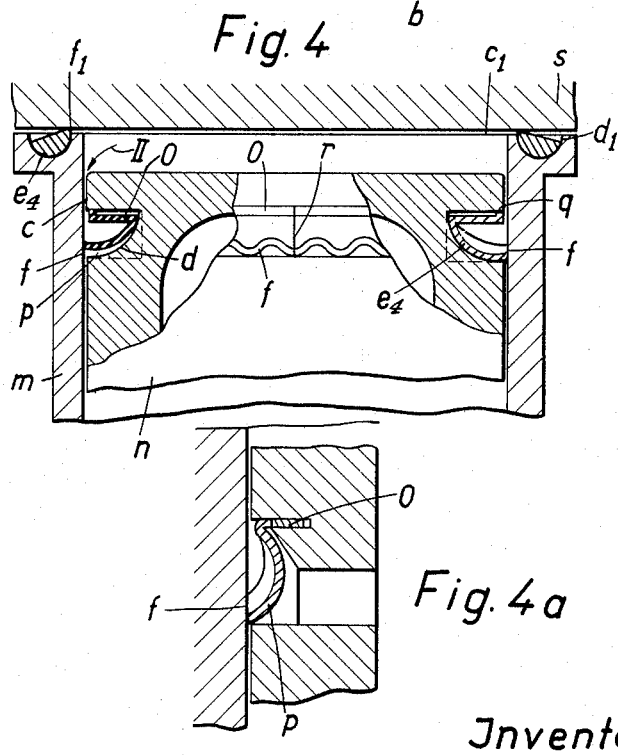
Fig. 4
Fig. 4a
Inventor:
FRIEDRICH STUEMPFIG

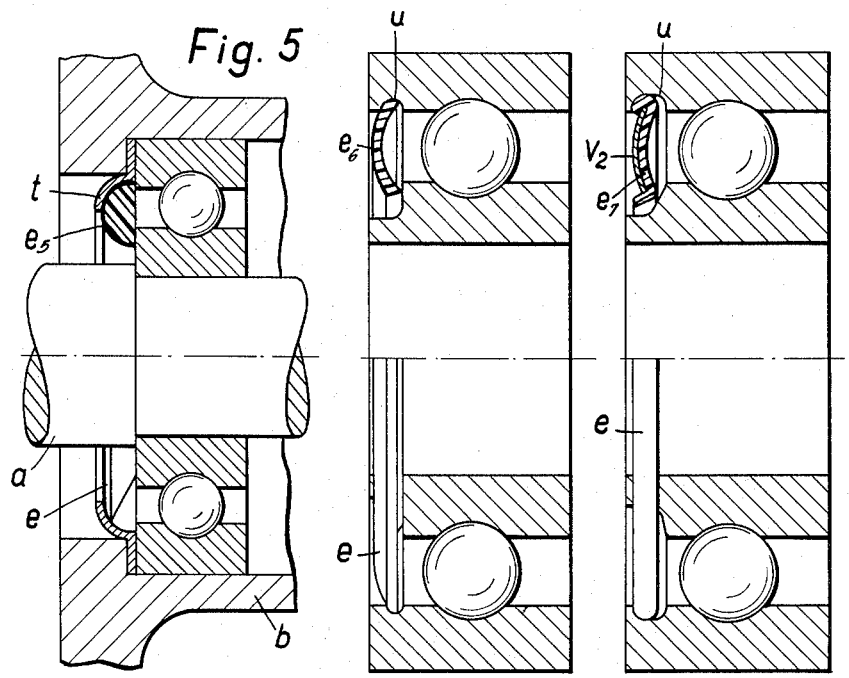
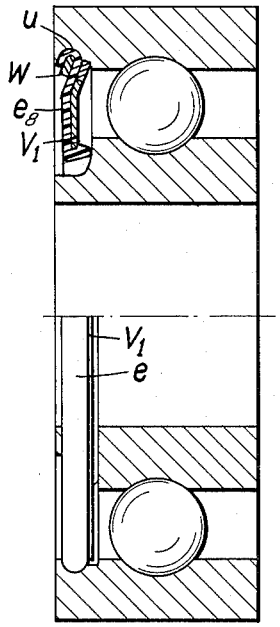
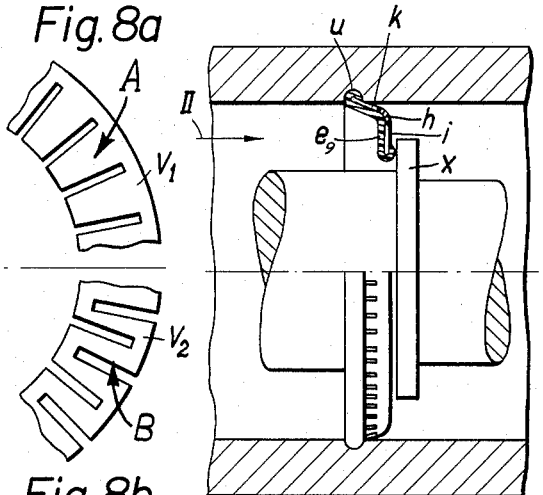
Inventor:
FRIEDRICH STUEMPFIG

3,231,287
PACKING INCLUDING ELASTIC SEALING RING
HAVING A TORSION AXIS
Friedrich Stuempfig, Bismarckstrasse 31,
Nurnberg, Germany
Filed May 26, 1959, Ser. No. 815,919
Claims priority, application Germany, May 28, 1958,
St 13,813
10 Claims. (Cl. 277—94)

The present invention relates to packings comprising a stationary or moving annular resilient sealing element which is forced yieldingly against a machine or other part or parts to be sealed off.

Such packings are desired, if not required to comply with several prerequisites, namely to be relatively inexpensive to manufacture, easy to mount or install in machines or bearings, necessitate relatively little space in order to enable use thereof even when space is very restricted, have a soft yielding action in order to keep down friction losses, heating and wear and tear thereof, possess an ample resiliency or deflection and great yieldingness so as still to seal satisfactorily machine parts which have become non-circular or rotate in non-circular fashion; retain the same springiness and the same strength of contact pressure over a long period so as always to retain a good sealing action; and exhibit great heat resistance in special types and applications, for example, for use as piston rings in internal combustion engines.

The known packings comprising resilient sealing elements are generally not yet satisfactory. The sealing elements thereof, which, for purposes of sealing off shafts, are generally formed as radially yielding annular sockets or bushings adapted to be clamped in place on one side thereof and which for other purposes, for example, for sealing off ball bearings, frequently have the form of axially yielding diaphragm rings or membrance members adapted to be clamped in place at the periphery thereof, generally have too hard and too inadequate a yielding action or spring characteristic thereby causing excessively large friction losses, excessive wear and frequently also excessive heating of the sealing elements and preventing a good sealing action in connection with machine parts which have become non-circular or rotate in non-circular fashion. If the resilient sealing elements consist entirely of metal, or have to be very small in size so as to be adapted to be accommodated within confined or restricted spaces in machines or inside normal anti-friction bearings, these drawbacks and disadvantages manifest themselves particularly strongly. Consequently, in order to improve these packings, it has been proposed already to utilize diaphragm-ring-like sealing elements made of metal which have been tiltably clamped along the periphery thereof in a fixed or stationary bearing, or to make the annular socket-shaped or diaphragm-ring-like sealing elements entirely of rubber or elastic synthetic resin and to arrange the same so as to be likewise clamped fixedly in place on one side thereof, so that in each case the part of the sealing element disposed opposite the clamping point and adapted to move to and fro could act as a sealing lip. In these known packings, the contact pressure required for the sealing action is produced solely or in substantial measure by the resilience of rubber or synthetic resin. The fault here is that in this case the contact pressure and thus the sealing action does not remain constant and adequate over a substantial period of time, because rubber and synthetic resin age with time and change their shape and properties of resilience or elasticity under the influence of heat, lubricants and contact pressure.

Moreover, thin-walled rubber or synthetic resin diaphragm sealing rings clamped at the periphery thereof become wavy or baggy with time and for this reason eventually fail to exert a sealing action. It is true that thick-walled diaphragm sealing rings made of rubber or plastic obviate the last-mentioned drawback, but in time they change the contact pressure, which is generally produced in this case by the cooperation with a metal spring, to a particularly large extent and moreover exhibit a very hard yielding action or spring characteristic, because a relatively large quantity of rubber or synthetic resin has to be deformed thereby and the short steel fingers or tongues heretofore employed as springs are likewise fixedly clamped at the periphery of the diaphragm sealing ring. A further disadvantage of the known sealing diaphragms which are fixedly clamped at the periphery thereof is that the installation or fitting thereof in ball bearings and other anti-friction bearings requires great care in order to avoid tilting of the packings and prevent the outer rings of the anti-friction bearings from becoming non-circular.

If the known yielding packings of the prior art have to withstand rather high temperatures, for example, as piston rings in internal combustion engines, and rubber or synthetic resin, therefore, cannot be employed, particularly poor results are obtained as regards a soft yielding action and a good sealing effect in cylinders which have become non-circular or the cross sectional dimensions of which have become different at different points. The conventional piston rings, which yield radially outwardly as a whole, are then no longer sufficient. For this reason, piston rings have already been proposed in the prior art which are rotatably mounted by means of a rounded portion thereof within grooves in the piston of rounded cross-section and which are provided with a conical collar directed towards the sliding surfaces of the cylinder, which collar is intended to be pressed against the sliding surface of the cylinder only by the pressure of the gas to be sealed off, but otherwise is not to rest firmly against the sliding surface. Such piston rings fail to act as soon as a cylinder has become non-circular or of varying cross-sectional dimensions, i.e., wider in some parts than in others. A further disadvantage of these piston rings resides in the fact that they have a very hard yielding action or spring characteristic and do not allow the piston itself to slide along the sliding surface of the cylinder.

The object of the present invention is to provide yielding packings which do not have the faults and defects described hereinabove with the known yielding packings of the prior art. To this end, the present invention proposes primarily that the sealing element is to be formed as a circular torsion spring or contain such a spring, and that the sealing elements are to be pressed constantly against a part to be sealed off either by the torsional resilience alone or by an additional device, for example, by another metal spring.

According to a further feature of the present invention, the sealing element is to be so arranged that its ends or edges are mounted in or on the parts holding the same, for example, a ball-bearing race, so that they are free at least on one side thereof. This means in practice that no holding or clamping counter-bearing or abutment is provided which might interfere with the capacity of the sealing element to turn about its torsion axis.

Accordingly, it is an object of the present invention to provide a packing whcih obviates the disadvantages and shortcomings of the prior art and which, notwithstanding its axial sealing characteristics is simple in structure and inexpensive in manufacture.

It is another object of the present invention to provide a packing, the sealing members of which may be readily installed into the equipment.

Still another object of the present invention is the provision of a packing providing a good seal with a relatively soft yielding action.

A further object of the present invention is the provision of a packing in which relatively small friction losses, relatively small heat and relatively small wear and tear takes place so as to increase the length of useful life of the packing.

Still another object of the present invention is the provision of a packing which utilizes a construction providing essentially constant contact pressure over long periods of time and which may be readily adapted for use as a seal made of heat resistant material.

A further object of the present invention is the provision of a packing which requires relatively little space.

Still another object of the present invention resides in the provision of a packing which produces a reliable seal even in case of out of round shafts or parts or in connection with parts rotating in a non-circular manner.

These and other objects, features and advantages will become more obvious from the following description when taken in connection with the accompanying drawing which shows, for purposes of illustration only, several embodiments in accordance with the present invention, and wherein:

FIGURE 1 is a cross-sectional view of a packing or sealing device adapted to be used as radially yielding packing in accordance with the present invention;

FIGURES 2, 3, 4 and 4a are cross-sectional views of modified embodiments of radially yielding packings in accordance with the present invention;

FIGURES 5, 6, 7 and 8 are cross-sectional views of sealing devices serving as axially yielding packings in accordance with the present invention;

FIGURE 8a is a partial elevational view of a metal spring ring as used in accordance with the embodiment of FIGURE 8;

FIGURE 8b is a partial elevational view of a modified embodiment of a metal spring ring used with the packing of FIGURE 8 with radially extending slots provided along the inner and outer circumference of the spring ring; and FIGURE 9 is still another modified embodiment of an axially yielding packing in accordance with the present invention.

The present invention permits of extremely varied design and application of the sealing elements, and also of the manufacture thereof from any desired resilient material, for example hardened steel, bronze, elastic rubber and elastic synthetic resins. The term "synthetic material" is hereinafter used for the last-mentioned materials.

Referring now to the drawings, wherein like reference characters are used throughout the various views to designate like parts, and more particularly to FIGURE 1, reference character $a$ designates therein a shaft which is rotatably arranged in a stationary housing $b$. An annular gap $c$ between the shaft $a$ and the housing $b$ is thereby to be sealed off against the pressure of a gas or liquid entering in the direction of the arrow II. For this purpose, a sealing ring $e$ made of rubber, synthetic rubber or plastic material is mounted in an annular groove $d$ provided in the housing $b$ so as to produce a sealing effect around the shaft $a$. With the shaft $a$ removed, the sealing ring $e$ can be easily inserted into the annular groove $d$ because of the elasticity of the former. The ring $e$ has a cross section which corresponds with that of a segment of a circular disc and the groove $d$ is of a corresponding part circular cross section. Consequently, the ring $e$ at first assumes within the groove $d$ the position thereof shown in FIGURE 1 in broken lines. When the shaft $a$ is pushed or inserted into the housing $b$ in the direction of the arrow I, the sealing ring $e$ twists or rotates within the annular groove $d$ about the axis of the corresponding circle thereof into the position shown in FIGURE 1 in full lines and now embraces or surrounds the shaft $a$ yieldingly under initial or pre-stress tension with a contact pressure which is uniform throughout, because in this position the inwardly disposed edge portion of the ring $e$ eacts as a sealing edge $f$ due to the fact that the edge $f$ has become somewhat stretched or lengthened whereas the outwardly disposed and longer edge portion $g$ is somewhat compressed. The shaft $a$ thus becomes tightly embraced owing to the torsional resilience of the sealing ring $e$ so that the annular gap $c$ is very reliably sealed. If the sealing ring $e$ were shortened a little on its right-hand side, as seen in FIGURE 1, and the sealing edge $f$ thereby brought closer to the annular torsional axis of rotation, then the pressure of the gas or liquid entering in the direction of the arrow II would only further increase the contact pressure of the sealing edge $f$ on the shaft $a$. The construction according to FIGURE 1 is an extremely simple and space-saving embodiment of a packing according to the present invention.

In the embodiment of FIGURE 2, the sealing ring $e_2$ is somewhat similar to that in FIGURE 1 but in this case, the ring $e_2$ of synthetic material is made hollow and the inwardly disposed edge portion or horn of the segment, seen in cross section, is removed so that there is a lateral opening into the interior of the hollow ring. Into this interior there is inserted an annular metal spring which consists of an angle-section ring $h$ provided with inner and outer circular sets of spring fingers or tongues $i$ and $k$ extending therefrom principally in the direction of the axis of the shaft $a$. The tongues of the set $k$ exert a spring action against the outer wall of the ring $e_2$ and thereby force this wall with a sealing action into the annular groove $d$ within the housing $b$, whereas the tongues of the set $i$ exert a spring action against the inner wall of the ring $e_2$ and press its edge $f$ against the shaft $a$ with a sealing action. In this arrangement, in addition to the spring action produced by the spring fingers $i$ and $k$, the ring $h$ also exerts a spring action about its annular torsion axis, whence the sealing edge $f$ can swing or oscillate radially outwards and inwards rather easily, i.e., can seal off satisfactorily even non-circular shafts or shafts rotating in non-circular fashion. By the use of the relatively thin inner wall of the sealing ring $e_2$, which wall is slightly thickened only at the sealing edge $f$, it is possible to obtain the result that the contact pressure acting on the sealing edge $f$ is produced in the main only by the torsional resilience of the ring $h$ and by the resilience of its sets of spring tongues $i$ and $k$, so that the contact pressure still does not undergo any substantial change even when the synthetic material used in connection therewith changes with time. The pressure of a gas or liquid which may enter in the direction of the arrow II further increases the contact pressure by entering the hollow ring $e_2$ and expanding it.

In the embodiment of FIGURE 3, the housing $b$ is a plain hollow cylinder through which the shaft $a$ passes concentrically and the sealing ring $e_3$ is not fitted into an annular recess as in FIGURES 1 and 2. In this example, the sealing ring $e_3$ is of acute angle section, and like the ring in FIGURE 2, it has inserted within it a metal spring ring consisting of an angle-section ring $h$ and sets of spring tongues $i$ and $k$ extending therefrom. The tongues of the outer set $k$ press the outer wall of the sealing ring $e_3$ against the encircling housing $b$, while the tongues of the inner set $i$ press the inner wall of the sealing ring $e_3$ inwardly so that its sealing edge or surface $f$ tightly embraces the shaft $a$. In this example also, the contact pressure is further increased by the pressure of a gas or liquid entering in the direction of the arrow II. Since, in this embodiment, only the outer peripheral edge of the sealing ring $e_3$ and the free end of the spring tongues $k$ are supported against the housing $b$ encircling the same, the ring $h$ can move transversely of the axis of the shaft $a$ in the case of shafts not truly circular or shafts rotating in non-circular fashion, so that even with very short spring tongues, i.e., with a very narrow sealing ring $e_3$, a soft yielding action and a good sealing effect can still be obtained. It is advantageous to make the spring tongues $k$ shorter than the spring tongues $i$, so that a greater contact pressure is exerted on the housing $b$ than on the shaft $a$. By means of a flange or rim $l$ engaging in a groove in housing $b$ and provided along the outer peripheral edge of the sealing ring $e_3$ or by means of bent portions provided on the spring tongues $k$, the entire packing is secured against axial displacement in the housing $b$. If a comparison is made between the construction according to FIGURE 3 and the conventional, radially yielding shaft packings, the construction in accordance with FIGURE 3 shows particularly clearly the advantages of the shaft packings according to the present invention.

Of course, approximately radially yielding packings according to the present invention can also be employed analogously for sealing off parts reciprocating within cylinders or in other bores, such as pistons or rods. Where high temperatures prohibit the use of synthetic material, it is possible to make the sealing ring $e$ described with reference to FIGURE 1 also of metal in an endless form or slit at one point, and to insert the same into an annular groove of rounded or angular cross-section. A particularly soft yielding action and a good sealing effect is thereby obtained even in connection with non-circular cylinders or cylinders of varying cross-sectional dimensions, if a metal sealing ring according to the present invention is provided with a corrugated formation of its sealing edge, which sealing edge slides along the sliding surface of the cylinder or bore.

An embodiment of such a construction is shown in FIGURE 4. In this case, a piston $n$ moving up and down in a cylinder $m$ must be so packed that the pressure of a gas or liquid acting in the direction of the arrow II cannot escape through the annular gap $c$ between the piston $n$ and the cylinder $m$. To this end, the metal sealing ring $e_4$ pressed out of flexible sheet metal is arranged in a groove $d$ formed around the piston. The ring $e_4$ is composed of a disc-shaped upper portion $o$ and of a corrugated lower portion $p$ connected thereto. The entire metal sealing ring $e_4$ is adapted to twist within the piston groove $d$ about an annular torsion axis $q$ located close to the sliding surface of the cylinder. As a result thereof, a spring sealing action is exerted against the piston at the place where the axis $q$ is located so that when the piston $n$ is removed it has its corrugated sealing edge $f$ projecting a small distance outside of such axis. When the piston $n$ is pushed into the cylinder $m$, the metal sealing ring $e_4$ twists yieldingly inwardly within the piston groove $d$ until its corrugated sealing edge $p$ bears flush against the sliding surface of the cylinder $m$ and a sealing action is now also produced thereat. Owing to the corrugated formation of the part $p$ of the metal sealing ring $e_4$ oscillating radially outwardly and inwardly, a soft yielding action of the metal sealing ring $e_4$ against the sliding surface of the cylinder is obtained even when the metal sealing ring $e_4$ is made of poorly elastic, heat-resisting metal. The corrugated sealing edge or sealing surface can be provided in known manner with a special running-in layer. If the metal sealing ring $e_4$ is supported on the bottom of the piston groove, the piston $n$ is guided satisfactorily even in an already worn-out, non-circular cylinder, i.e., piston slap is obviated. Nevertheless, the metal sealing ring $e_4$ can also be employed in a piston groove of rectangular cross-section, as indicated by the dash lines in FIGURE 4, without having to rest on the bottom of the piston groove $d$, so that transverse movements of the piston $n$ within the cylinder are compensated thereby by transverse movements of the metal sealing ring $e_4$ within the piston groove $d$, i.e., an outward and inward yielding action of the metal sealing ring $e$ is not necessary for this purpose. A slit $r$ in the metal sealing ring suitable for inserting the latter in the piston groove can be so arranged that the slit does not leave any gap when the metal sealing ring has been inserted. The metal sealing rings corrugated in accordance with the present invention may moreover be of very varied design. For example, as shown in FIGURE 4a the corrugated lower portion $p$ of the sealing ring can be connected to the outer edge of a disc-shaped upper portion $o$ thereof and yield in twisting fashion about this connection. Also, only the upper portion need be held in a piston groove, or the entire metal sealing ring can be so held from both above and below. The resistance to heat, the soft spring action and the good sealing effect make the metal sealing rings according to the present invention suitable in particular as piston rings, and in fact both as compression rings and as oil scraper rings for internal combustion engines.

FIGURE 4 also shows the application of a packing according to the present invention with axial yielding action for sealing off two plane surfaces. In this case, the metal sealing ring $e_4'$ has to seal off yieldingly the gap $c_1$ between the cylinder $m$ formed as a cylinder liner and the cylinder head $s$ of an internal combustion engine, because when the engine becomes hot the cylinder liner $m$, which is forced into a cylinder block (not shown), expands or lengthens more than the cylinder block and the gap $c_1$ then becomes narrower than that between the cylinder block and the cylinder head. The sealing edge $f_1$ of sealing ring $e_4'$ is continually pressed against the cylinder head $s$ by the torsional resilience of the sealing ring $e_4'$. At the same time, the sealing ring $e_4'$ also abuts with a sealing action against the annular groove $d_1$ formed in the head of the liner $m$, so that in this way sealing-off is obtained even with different widths of the gap $c_1$.

Another axially yielding packing is shown in the embodiment of FIGURE 5, where a sealing ring $e_5$ of synthetic material has to seal off one side of a ball bearing arranged on the shaft $a$ and in the housing $b$. In the disassembled or removed state, this sealing ring $e_5$, which is rather thin-walled and made of synthetic material, has a smaller conicity, i.e., its outer periphery has a smaller diameter than shown in FIGURE 5. For this reason, and when the ring is in the assembled or installed condition thereof as shown in FIGURE 5, its torsional resilience causes the outer part of one of its lateral surfaces to be pressed with a sealing action against a fixed mounting or stationary support $t$, while the inner part of its opposite lateral surface is pressed with a sealing action against the inner ring or race of the ball bearing. The space occupied by this packing can be kept so small in the axial direction that the packing can be used with equal effectiveness inside ball bearings of normal external dimensions, as can be seen from FIGURE 6. In this case, a groove $u$ in the outer ring of the ball bearing then serves as a holding means, which supports the sealing ring $e_6$ made of synthetic material, the ring $e_6$ being pressed by its torsional resilience into sealing relationship against the inner ring of the ball bearing, and with a sealing action taking place only at the outer part of one of its lateral surfaces, while no pressure is exerted on its end face. Of course, to obtain a permanently constant contact pressure, it is also possible to make the sealing rings $e_5$ and $e_6$ according to FIGURES 5 and 6 entirely of spring metal or to make them up from spring metal and synthetic material. For example, the sides of a spring metal disc may be coated wholly or partly with a thin layer of synthetic material. If the material of the sealing rings is arranged mainly about the torsion axis thereof or in or close to the plane passing through the torsion axis, as shown in FIGURES 5 and 6, solid metal rings with or without a coating of synthetic material also have a rather soft yielding action.

To obtain a very soft yielding action and an ample deflection, it is advisable to employ a slotted metal spring ring together with a ring of synthetic material, as shown in FIGURES 7 and 8. Fragments A and B of such slotted metal spring rings are shown in plan view in FIGURE 8a and in FIGURE 8b alongside FIGURE 8. In the embodiment according to FIGURE 7, a metal spring ring $v_2$ is slotted radially outwardly and inwardly thereof in accordance with the showing of fragment B of FIGURE 8a. This metal spring ring $v_2$, by means of its torsional resilience about its annular torsion axis, presses the thin-walled ring $e_7$ of synthetic material at the inner periphery thereof into sealing relationship against the inner ring of the ball bearing and at the outer periphery thereof into sealing relationship against the outer lateral flank of the annular groove $u$ in the outer ring of the ball bearing, so that the relevant side of the ball bearing is sealed off. As the outwardly and inwardly slotted metal spring ring $v_2$ also has a radial spring action at the same time, the metal spring ring $v_2$ may also be additionally used to press the outer hollow bead-like rim of the ring $e_7$ of synthetic material against the base of the groove $u$, so as further to improve the sealing effect at that point. It is to be noted that the contact pressure acting on the inner ring of the ball bearing becomes somewhat stronger or weaker according to whether the outer edge of the metal spring ring $v_2$ is arranged to the left or to the right of a plane taken through its torsion axis. The effect of the radial yielding action and of the soft axial yielding action of the metal spring ring is that any change in the synthetic material when pressed into the groove $u$ cannot have an unfavorable influence on the action of the packing.

FIGURE 8 shows another modified form of a slotted metal spring ring and a ring of synthetic material for sealing off a ball bearing. The ring $e_8$ of synthetic material employed in that embodiment has a hollow bead at its outer edge and also at its inner edge. By means of a flexible wire or Seeger ring $w$ inserted in the outer bead, the latter is pressed with a sealing action into the groove disposed in the outer ring of the ball bearing, while the metal spring ring $v_1$ slotted in accordance with the fragment A of FIGURE 8a, due to its torsional resilience, presses the inner bead of the ring $e_8$ with a sealing action against the inner ring of the ball bearing. The ring $e_8$, meanwhile, is supported by the outer part of one of its lateral surfaces against the wire or Seeger ring $w$. At the same time, no pressure whatsoever acts on the end face of the metal spring ring. Instead of the metal spring ring slotted radially outwardly, it is also possible to employ a metal spring ring slotted from the outside towards the inside or a metal spring ring slotted from the outside and from the inside not quite as far as the center of the ring.

The thin sealing rings yielding due to torsion which are employed in the example according to FIGURES 5 to 8, have, as compared with the known packings, and in addition to the great advantages of a constant lasting soft yielding action with ample deflection, the further advantage that they can be fitted easily into ball bearings or in other places by causing the sealing rings to snap resiliently into a groove.

Finally, FIGURE 9 shows an axially yielding shaft seal which is required to exert a sealing action against the pressure of a gas or liquid acting in the direction of the arrow II and likewise uses for this purpose a ring $e_9$ of synthetic material and a metal spring ring. The latter consists of an angle-section or bent-section ring $h$ provided with rows of spring fingers or tongues $i$ and $k$ mounted thereon. The spring tongues $k$ engage in the outer bead of the ring $e_9$ and press it with a sealing action against the bore of the housing $b$ or into a groove $u$ disposed therein, while the spring tongues $i$ engage in the inner bead of the ring $e_9$ and press it with a sealing action against a flange $x$ of the shaft. Advantageously, the spring tongues $k$ are also made somewhat shorter in this case than the spring tongues $i$, in order to achieve a greater contact pressure on the housing than on the flange of the shaft. In this embodiment, the ring $h$ also performs a yielding action about its annular torsion axis, as in the case of the embodiment of FIGURE 3. The advantages of the latter also apply analogously in this case. It is also possible, in the embodiment according to FIGURE 9, to arrangethe spring tongues $k$ and that part of the ring $e_9$ which rests against them substantially parallel to the spring fingers $i$ and to support them on an end wall provided in the housing and extending parallel to the flange on the shaft. This affords the advantage that during the yielding action the ring $h$ now also moves axially and the yielding action becomes particularly soft with good amplitude of deflection. Also, the dimensions of the packing can be kept very small.

The embodiments described hereinabove permit of very varied design of their individual parts, as shown by the following examples. All the sealing rings may be partly enclosed by a special sheet metal casing. Metal spring rings formed in other ways can likewise be employed. In metal spring rings, oblique slots may be employed instead of axial or radial slots. By means of a very large number of narrow spring tongues and a particularly deep slotted construction of the metal spring rings, a particularly soft yielding action and a very good sealing effect are obtained. Instead of the slotted metal spring rings, the use of spring rings made of spring steel wire is also possible. When synthetic material and a metal spring ring are employed together, the former can also be vulcanized onto the metal spring ring. A narrow groove $u$ in the outer ring of a ball bearing makes the packings according to FIGURES 7 and 8 suitable also for sealing off the ball bearing against external pressure.

The forms of packing hereinbefore described, or other types according to the invention, can also be employed in numerous other cases. For example, even rings of synthetic material of rounded cross-section, with or without a metal spring, which move a sealing edge axially by means of the torsional resilience thereof, may be made to serve satisfactorily for sealing off the shaft shown in FIGURE 9. Furthermore, the embodiments shown in FIGURES 1 to 3 may be employed for sealing off reciprocatory machine parts and the corrugated type of packing according to FIGURE 4 may be used for sealing off a rotating machine part. A plurality of packings according to the invention can be arranged in series and may be arranged as a labyrinth packing. As examples of further possible applications, there may be mentioned the sealing off of tapered roller bearings having a turning movement, ball-and-socket joints, pipe couplings and slide valves and also the yielding bringing into contact and sealing off of any desired non-moving parts against other stationary parts.

As compared with the known packings, in which the yielding part is either fixedly clamped at one edge or the whole of the material of the packing must yield radially outwardly and inwardly as a piston ring, the packings according to the invention have a softer yielding action and a greater amplitude of deflection because in this case the resilient packing member and the spring arms are disposed between two abutments without their ends being fixedly clamped and the material of the packing can be arranged mainly about the torsion axis or in the vicinity of the plane extending through the torsion axis, so that great distortion of the material is dispensed with during the yielding action. The advantages resulting from the softer yielding action and greater deflection are a smaller frictional loss, less heating of the packing, less wear and a better sealing effect in the case of non-circular machine parts or machine parts moving in a non-circular fashion and also smaller space requirements. If the packings consist of thin-walled synthetic material and of a thin, deeply slotted metal spring ring, or a corresponding spring steel wire ring, the yielding action and the deflection become particularly favorable and the aforesaid advantages particularly great, without the yielding action being substantially impaired owing to any change in the synthetic material taking place in the course of time. Owing to the small amount of space required, the packings according to the present invention can also be employed with a good effect in places where the packings heretofore known do not have sufficient room or do not achieve a constant contact pressure, i.e., a good sealing action, in the long run. In the sealing off of very hot machine parts, the packings according to the present invention afford the further advantage that even when they are made entirely of metal they still have a comparatively soft yielding action and their yielding action can be further improved by corrugated design of the sealing lip, so that a good seal is also obtainable in connection with bores or cylinders which are not truly circular or are of varying dimensions. As illustrated by the various embodiments of the present application, the packings according to the present invention are also adapted to be manufactured cheaply and easily fitted or installed by causing them to snap resiliently into a groove.

Thus, while I have shown several embodiments in accordance with the present invention, it is understood that the same is not limited thereto but is susceptible of many changes and modifications within the spirit and scope of the present invention, and I therefore do not wish to be limited to the details thereof shown and described herein, but intend to cover all such changes and modifications as are encompassed by the scope of the appended claims.

I claim:

1. An arrangement for sealing an annular gap between two bodies defining said gap, comprising:
    sealing means between said two bodies including an annular spring ring of resilient material and bounded by an outer annular rim and an inner annular rim substantially concentric therewith,
    adjacent portions of said bodies being so shaped as to non-clampingly engage respective rim portions of said spring ring,
    said spring ring having an annular axis substantially concentric with said rims and disposed between the inner and outer rims thereof, and at least the rim portions of said spring ring being elastically yielding so that said spring ring can be twisted about said axis and is effective as stressed spring ring in the twisted condition thereof,
    the adjacent portions of one of said bodies being in yielding circumferential contact with one of said rim portions to twist said one rim portion about said axis within the elastic limits of the resilient material and thereby stress said spring ring, and the other rim portion being in elastically yielding circumferential engagement with the adjacent portions of said other body and exerting a yielding pressure against a face of the other of said bodies in one direction owing to the stressing by engagement of said one rim portion with said one body,
    and the adjacent portions of said other body being so shaped as to permit free and unobstructed yielding of said other rim portion in a direction substantially opposite to said one direction.

2. An arrangement according to claim 1, in which said spring ring consists of full-walled elastic material.

3. An arrangement according to claim 1, wherein one of said two bodies is a relatively movable part and the other of said two bodies is a relatively stationary part.

4. An arrangement according to claim 1, wherein said spring ring is provided with approximately radial slots at least on one rim thereof.

5. An arrangement according to claim 1 wherein the cross section of the spring ring tapers off in a direction toward at least one of said rims.

6. An arrangement according to claim 1 wherein both the inner and outer rims of said spring ring are provided with approximately radially extending slots.

7. An arrangement according to claim 1, wherein said sealing means includes a sealing ring and said spring ring, said spring ring having at least in one of the inner and outer rim portions approximately radial slots to facilitate twisting of the spring ring about said axis, and said sealing ring consisting of elastic, relatively thin-walled material and covering the slots of said spring ring.

8. An arrangement according to claim 7 in which said spring ring consists of springy metal.

9. An arrangement according to claim 7 wherein the radial cross section of said spring ring has a curved shape.

10. An arrangement according to claim 2 wherein said spring ring essentially consists of rubber-like plastic material.

References Cited by the Examiner

UNITED STATES PATENTS

| 1,490,716 | 4/1924 | Schwennker | 286—26 |
| 2,088,703 | 8/1937 | Hubbard et al. | 288—3 |
| 2,454,036 | 11/1948 | Clayton-Wright | 288—3 |
| 2,764,433 | 9/1956 | Cobb | 286—5 |

FOREIGN PATENTS 978,288    4/1951    France.

LAVERNE D. GEIGER, Primary Examiner.

CORNELIUS D. ANGEL, WALTER A. SCHEEL, EDWARD V. BENHAM, LEWIS J. LENNY, Examiners.